US012617081B2

(12) United States Patent
Eom et al.

(10) Patent No.: US 12,617,081 B2
(45) Date of Patent: May 5, 2026

(54) MOBILE MANIPULATOR ROBOT AND METHOD FOR USING THE SAME

(71) Applicant: HYUNDAI MOBIS CO., LTD., Seoul (KR)

(72) Inventors: Il Yong Eom, Seongnam-si (KR); Young Gi Jung, Suwon-si (KR); Hyeon Guk Kim, Hwaseong-si (KR); Ju Mong Lee, Suwon-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 229 days.

(21) Appl. No.: 18/347,226

(22) Filed: Jul. 5, 2023

(65) Prior Publication Data

US 2024/0009834 A1    Jan. 11, 2024

(30) Foreign Application Priority Data

Jul. 7, 2022    (KR) ......................... 10-2022-0083869
Jul. 7, 2022    (KR) ......................... 10-2022-0083870

(51) Int. Cl.
B25J 9/16      (2006.01)
B25J 13/08     (2006.01)
B25J 19/02     (2006.01)

(52) U.S. Cl.
CPC ............. B25J 9/162 (2013.01); B25J 9/1633 (2013.01); B25J 9/1676 (2013.01); B25J 9/1697 (2013.01); B25J 13/081 (2013.01); B25J 19/022 (2013.01)

(58) Field of Classification Search
None
See application file for complete search history.

(56) References Cited

U.S. PATENT DOCUMENTS

2013/0184980 A1 *   7/2013   Ichikawa ................. G05D 1/02
                                                           701/301
2022/0009104 A1 *   1/2022   Wahrmann Lockhart ...................
                                                           G16H 80/00

FOREIGN PATENT DOCUMENTS

DE      102021113636 B3 *  11/2022   ............ B25J 9/1674
JP        2008200764 A   *  9/2008

OTHER PUBLICATIONS

English translation of JP-2008200764-A (wherein the paragraph numbering provided coincides with any relevant citations to this reference within the accompanying Office Action) (Year: 2008).*
English translation of DE-102021113636-B3 (wherein the paragraph numbering provided coincides with any relevant citations to this reference within the accompanying Office Action) (Year: 2022).*

(Continued)

*Primary Examiner* — Jason Holloway
*Assistant Examiner* — Bryant Tang
(74) *Attorney, Agent, or Firm* — NSIP Law

(57)    ABSTRACT

Disclosed are mobile manipulator and methods of using the mobile manipulator, there the mobile manipulator includes an autonomous mobile robot (AMR) comprising a LiDAR sensor, a camera sensor, and a moving member, a manipulator robot comprising a torque sensor, a current sensor, and an image sensor, and a processor is configured to determine, via the AMR, whether a worker is approaching, determine, via the manipulator robot, whether the worker interferes with an operation of the mobile manipulator robot, activate a touching mode, in response to the determining of the interference by the worker, and analyze a force for a robot operation based on touching to operate at least one of the AMR or the manipulator robot.

18 Claims, 26 Drawing Sheets

(56)                          References Cited

OTHER PUBLICATIONS

M. Vasic and A. Billard, "Safety issues in human-robot interactions," 2013 IEEE International Conference on Robotics and Automation, Karlsruhe, Germany, 2013, pp. 197-204 (Year: 2013).*

* cited by examiner $f < f_a$ $$f_a < f < f_b$$

2000

2000

$V_1 + V_2 < V_2$ $V_1 + V_2 = V_2$

MOBILE MANIPULATOR ROBOT AND METHOD FOR USING THE SAME

CROSS REFERENCE TO RELATED APPLICATION

This application claims the benefit under 35 U.S.C. § 119(a) of Korean Patent Application Nos. 10-2022-0083869, filed on Jul. 7, 2022 and 10-2022-0083870, filed on Jul. 7, 2022, in the Korean Intellectual Property Office, the entire disclosure of which are incorporated herein by reference for all purposes.

BACKGROUND

1. Field

The present disclosure relates to a mobile manipulator robot, and specifically, to a teaching method using an autonomous mobile robot (AMR) and a manipulator robot.

2. Discussion of Related Art

Recently, as the number of factories in a form of smart factories increases, a mobile robot in a form of an automatic guided vehicle (AGV) that moves along a guide used in an existing factory or a warehouse has been proposed and used.

Because the AGV is limited to moving along the guide on a predetermined path within the smart factory, research on an autonomous mobile robot (AMR)-type mobile robot that does not require the guide and is flexibly applicable to a field situation is increasing recently.

In addition, as a fixed-type manipulator robot that has been used for assembly, palletizing, and the like is mounted on the autonomous mobile robot (AMR) and moves, various types of work are being attempted.

Therefore, in operating a mobile manipulator, which is a combination of the AMR and the manipulator robot, a method for easily operating a robot that may be touched by a worker is needed.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a mobile manipulator robot including an autonomous mobile robot (AMR) comprising a LiDAR sensor, a camera sensor, and a moving member, a manipulator robot comprising a torque sensor, a current sensor, and an image sensor, and a processor is configured to determine, via the AMR, whether a worker is approaching, determine, via the manipulator robot, whether the worker interferes with an operation of the mobile manipulator robot, activate a touching mode, in response to the determining of the interference by the worker, and analyze a force for a robot operation based on touching to operate at least one of the AMR or the manipulator robot.

The processor may be configured to recognize a contact of the worker via sensor information received from the manipulator robot, in response to the worker griping the manipulator robot, and determine that the interference with the worker has occurred, in response to the sensor information received from the manipulator robot exceeding a threshold.

The processor may be configured to determine a location of contact between the manipulator robot and the worker, determine a strength of the force needed for the robot operation, determine a direction of the force needed for the robot operation, and determine an applied time period of the force needed for the robot operation.

The processor may be configured to determine whether to control all axes or to control some axes of the manipulator robot based on the location of the contact, and control the AMR and the manipulator robot to operate simultaneously, in response to determining to control all of the axes.

The processor may be configured to control the AMR or the manipulator robot to operate, in response to determining to control some of the axes.

The processor may be configured to control only the manipulator robot to operate, in response to determining the strength of the force for the robot operation is smaller than a first range.

The processor may be configured to control the manipulator robot and the AMR to operate simultaneously, in response to determining the strength of the force for the robot operation is equal to or greater than a first range and is equal to or lesser than a second range.

The processor may be configured to control the AMR to operate by projecting the direction of the force for the robot operation to a XZ plane, and control the manipulator robot to operate by projecting the direction of the force for the robot operation to a XY plane.

The processor may be configured to control the mobile manipulator robot to operate by the touching, in response to the force for the robot operation being generated and maintained for a time period or more.

The processor may be configured to recognize the worker via the AMR to determine whether the worker is approaching, determine, via the manipulator robot, whether the worker collides with the mobile manipulator robot, activate a safe mode in response to the collision with the worker, and analyze an avoidance direction based on the collision to control at least one of the AMR or the manipulator robot.

The processor may be configured to determine whether a distance sensed by the LiDAR sensor is within a threshold area, and distinguish the worker using the image sensor when the distance is within the threshold area.

The processor may be configured to calculate the avoidance direction of the manipulator robot, in response to determining that the worked collides with the manipulator robot, control the manipulator robot to perform an avoidance operation, in response to the avoidance direction being calculated, determine whether the mobile manipulator robot will collide with the worker, based on the avoidance operation of the manipulator robot, and control the AMR and the manipulator robot to simultaneously perform the avoidance operation, in response to the mobile manipulator robot colliding with the worker.

The processor may be configured to generate vector coordinates in an opposite direction of an impact caused by the collision between the mobile manipulator robot and the worker.

The processor may be configured to determine whether the vector coordinates are beyond a movement limit of the manipulator robot.

The processor may be configured to control the mobile manipulator robot to return to a state before the collision after the avoidance operation.

The processor may be configured to store location information of each of the manipulator robot and the AMR at a moment when the collision occurs, determine whether the collision situation is released by the avoidance operation, control at least one of the manipulator robot or the AMR to move to the stored location, in response to the collision situation is released by the avoidance operation.

The processor may be configured to determine whether a magnitude of an impact caused by the collision is equal to or smaller than a threshold, determine whether the impact is applied within a predetermined time period, in response to the magnitude of the impact being equal to or smaller than the threshold, and determine that the collision situation is released, in response to the impact being applied within the predetermined time period.

The processor may be configured to check a location before when the AMR moves before the collision, check the location via the manipulator robot corresponding to a feature point of a worktable, and correct the location of the mobile manipulator robot via calibration.

In another general aspect, there is provided a processor-implemented method for controlling a mobile manipulator robot including an autonomous mobile robot (AMR) and a manipulator robot, the method including determining, via the AMR, whether a worker is approaching, determining, via the manipulator robot, whether the worker interferes with an operation of the mobile manipulator robot, activating a touching mode, in response to the determining of the interference by the worker, and analyzing a force for a robot operation based on touching to operate at least one of the AMR or the manipulator robot.

In another general aspect, there is provided a processor-implemented method for safely controlling a mobile manipulator robot including an autonomous mobile robot (AMR) and a manipulator robot, the method including determining, via the AMR, whether a worker is approaching, determining, via the manipulator robot, whether the worker collides with the mobile manipulator robot, activating a safe mode in response to the collision with the worker, and analyzing an avoidance direction based on the collision to control at least one of the AMR or the manipulator robot.

Other features and aspects will be apparent from the following detailed description, the drawings, and the claims.

Figure 1:
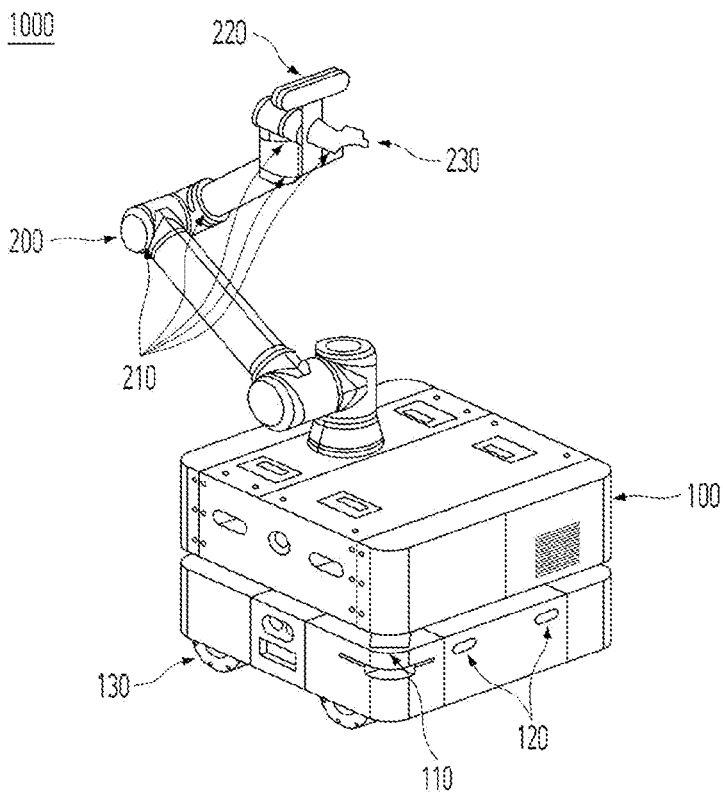
FIG. 1 is a diagram for illustrating a mobile manipulator robot including an AMR and a manipulator robot according to an embodiment of the present disclosure.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DESCRIPTION OF SPECIFIC EMBODIMENTS

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the present document, when a component is referred to as "including" another component, it implies a presence of the latter component, along with a possibility of additional components, unless otherwise stated.

FIG. 1 is a diagram for illustrating a mobile manipulator robot including an AMR and a manipulator robot according to an embodiment of the present disclosure.

Referring to FIG. 1, a mobile manipulator robot 1000 according to the present embodiment may be composed of an autonomous mobile robot (AMR) 100 and a manipulator robot 200.

The AMR 100 according to the present embodiment may include a LiDAR sensor 110 and a camera sensor 120 for recognizing an object including a thing, a person, and the like approaching the AMR 100, and a moving member 130 for moving the AMR.

The LiDAR sensor 110 may detect the surrounding object outside the AMR 100 by transmitting a laser signal to a periphery of the AMR 100 and receiving a signal reflected back from the corresponding object. The LiDAR sensor 110 may detect the surrounding object located within a set distance, a set vertical field of view, and a set vertical field of view predefined based on a specification thereof. The LiDAR sensor 110 may include a front LiDAR sensor, a top LiDAR sensor, and a rear LiDAR sensor respectively installed on front, top, and rear surfaces of the AMR 100, but installation locations and the number of LiDAR sensors are not limited to those in a specific embodiment. A threshold value for determining validity of the laser signal returning by being reflected back from the corresponding object may be stored in advance in a memory (not shown) of the robot, and the AMR 100 may determine a location (including a distance to the corresponding object), a speed, and a moving direction of the corresponding object via a scheme for measuring the time for the laser signal transmitted via the LiDAR sensor 110 to return by being reflected from the corresponding object.

The camera sensor 120 may detect the surrounding object outside the AMR 100 by capturing an image of the periphery of the AMR 100, and may detect the surrounding object located within a set distance, a set vertical field of view, and a set vertical field of view predefined based on a specification thereof. The camera sensor 120 may include a front camera sensor, a left camera sensor, a right camera sensor, and a rear camera sensor installed on front, left side, right side, and rear surfaces of the AMR 100, respectively, but installation locations and the number of camera sensors are not limited to those in a specific embodiment. The AMR 100 may determine the location (including the distance to the corresponding object), the speed, the moving direction, and the like of the corresponding object by applying predefined image processing to the image captured via the camera sensor 120.

It is assumed that the moving member 130 is a member for supporting a load of the AMR 100 and collectively refers to a form such as a wheel, a caster, or a fixed leg. However, for convenience of description, a following description will focus on a case in which the moving member 130 is the 'wheel'.

In one example, the manipulator robot 200 may include a contact sensor assembly 210 including a force or torque sensor for determining a contact with the object, a current sensor for determining a degree of movement or load of the manipulator robot 200, and a force-torque (FT) sensor at a distal end of the manipulator robot 200.

In addition, in the manipulator robot 200, an image sensor 220 for capturing an image of the outside may be mounted at a predetermined location (e.g., a gripper) 230 of the manipulator robot 200, and the manipulator robot 200 may monitor a behavior and a condition of a worker based on the image obtained via the image sensor 220.

Therefore, the mobile manipulator robot 1000 may be taught at a desired location while the worker holds the manipulator robot 200 without moving each robot individually for work.

The mobile manipulator robot 1000 may control the AMR 100 and the manipulator robot 200 to operate when the worker holds and touches the manipulator robot 200.

In one example, the mobile manipulator robot 1000 may monitor a surrounding situation for safety. The AMR 100 may continuously monitor a collision with the worker or the surrounding object by utilizing information from the surrounding sensors (the LiDAR and the camera). The manipulator robot 200 may continuously monitor whether a force equal to or greater than a torque required for operation or the touching is generated.

Accordingly, the mobile manipulator robot 1000 may perform an emergency stop for safety of the worker when a signal with a level equal to or higher than a certain level is monitored.

Figure 2:
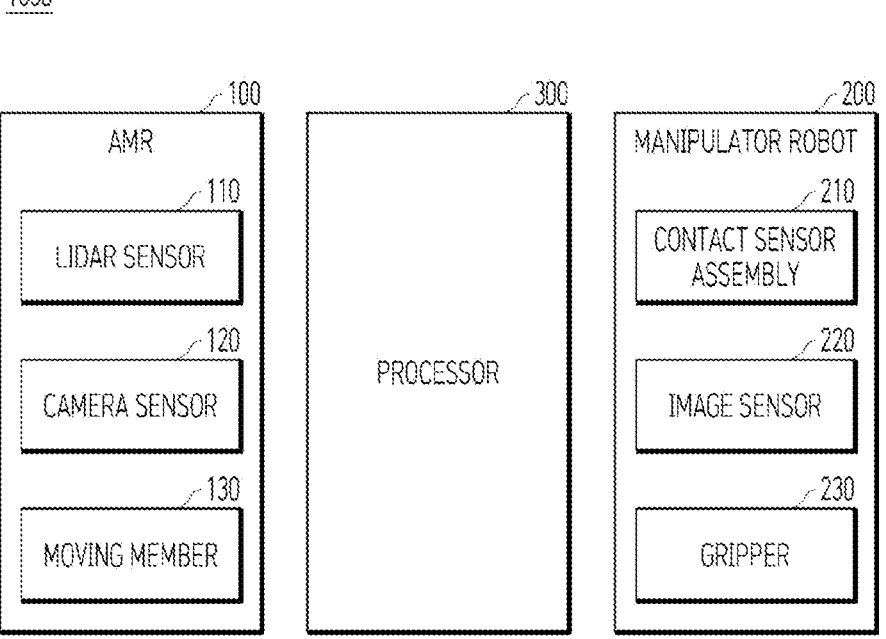
FIG. 2 is a block diagram of a mobile manipulator robot according to an embodiment of the present disclosure.

FIG. 2 is a block diagram of a mobile manipulator robot according to an embodiment of the present disclosure.

As shown in FIG. 2, the mobile manipulator robot 1000 may include a processor 300 for controlling the robot 1000 to operate by sensing and distinguishing a moment when the worker grips the mobile manipulator robot 1000 for the touching using the sensor information received from the AMR 100 and the manipulator robot 200.

The processor 300 may recognize the approaching worker via the AMR 100 to determine whether the worker is approaching.

The processor 300 may determine whether the worker interferes via the manipulator robot 200. For example, the processor 300 may determine the interference of the worker during operation from the information of the sensor (the current, the torque, and the force).

The processor 300 may activate a touching mode when there is the interference of the worker. In this regard, for example, when a torque or a force applied by the interference of the worker exceeds a range of a torque or a force required for the operation of the mobile manipulator robot 1000 based on the sensor information, and when this is determined to be external interference, the processor 300 may activate the touching mode.

The processor 300 may analyze the force required for the robot operation based on the touching and control at least one of the AMR 100 and the manipulator robot 200 to operate.

The processor 300 may determine a location where the manipulator robot 200 and the worker come into contact with each other, and determine whether to control all axes or some axes of the manipulator robot 200 based on the contact location. The processor 300 may control the operation of the mobile manipulator robot 1000 under the control of all of the axes or the control of some axes.

For example, when all of the axes of the manipulator robot 200 need to be controlled, the processor 300 may control the AMR 100 and the manipulator robot 200 to operate simultaneously. When some axes need to be controlled, the processor 300 may control the AMR 100 or the manipulator robot 200 to operate.

The processor 300 may determine a strength of the force required for the robot operation. The processor 300 may control the operation of the mobile manipulator robot 1000 in response to the strength of the force.

For example, when the strength of the force required for the robot operation is smaller than a first range, the processor 300 may control only the manipulator robot 200 to operate. When the strength of the force required for the robot operation is equal to or greater than the first range and within a second range, the processor 300 may control the manipulator robot 200 and the AMR 100 to operate simultaneously.

The processor 300 may determine a direction of the force required for the robot operation. The processor 300 may control the operation of the mobile manipulator robot 1000 in response to the direction of the force.

For example, the processor 300 may control the AMR 100 to operate by projecting the direction of the force required for the robot operation onto a XZ plane. The processor 300 may control the manipulator robot 200 to operate by projecting the direction of the force required for the robot operation onto a XY plane.

The processor 300 may determine an applied time period of the force required for the robot operation. The processor 300 may control the operation of the mobile manipulator robot 1000 in response to the applied time period of the force.

For example, the processor 300 may control the mobile manipulator robot 1000 to operate by the touching when the force required for the robot operation is generated and maintained for a predetermined time period or more.

In one example, the processor 300 recognizes the approaching worker via the AMR 100 to determine whether the worker is approaching. The processor 300 may determine whether the distance sensed by the LiDAR sensor 100 is within a preset area or a threshold area. When the distance is within the preset area, the processor 300 may distinguish the worker using the image sensor.

The processor 300 may determine whether there is the collision with the worker via the manipulator robot 200. For example, the processor 300 may determine the collision of the worker during the operation from the information of the sensor (the current, the torque, and the force).

The processor 300 may activate a safe mode in response to the collision with the worker. For example, when a torque or a force applied by the collision of the worker exceeds the range of the torque or the force required for the operation of the mobile manipulator robot 1000 based on the sensor information and when this is determined to be an external collision, the processor 300 may activate the safe mode.

The processor 300 may analyze an avoidance direction based on the collision to control at least one of the AMR and the manipulator robot to operate.

The processor 300 may calculate the avoidance direction of the manipulator robot in response to the collision between the manipulator robot and the worker.

For example, the processor 300 may generate vector coordinates in an opposite direction of an impact resulting from the collision between the manipulator robot and the worker.

The processor 300 may control the manipulator robot to perform an avoidance operation in response to the calculated avoidance direction.

The processor 300 may determine whether the avoidance of the collision with the worker is impossible based on the avoidance operation of the manipulator robot.

For example, the processor 300 may determine whether the generated vector coordinates are beyond a movement limit of the manipulator robot.

When the collision avoidance is impossible, the processor 300 may control the AMR and the manipulator robot to simultaneously perform the avoidance operation.

In addition, the processor 300 may control the mobile manipulator robot to return to a state before the collision after the avoidance operation.

The processor 300 may store location information of each of the manipulator robot and the AMR at a moment when the collision occurs, determine whether the collision situation is released by the avoidance operation, and when the collision situation is released by the avoidance operation, control at least one of the manipulator robot and the AMR to move to the stored location.

The processor 300 may determine whether a magnitude of the impact resulting from the collision is equal to or smaller than a preset value, determine whether the impact is applied within a preset time period when it is determined that the magnitude of the impact is equal to or smaller than the preset value, and determine that the collision situation is released when it is determined that the impact is applied within the preset time period, When the AMR moves to the location before the collision, the processor 300 may check a location before the work, confirm the location in response to a feature point of a worktable via the manipulator robot, and correct the location of the mobile manipulator robot via calibration.

Figure 3A:
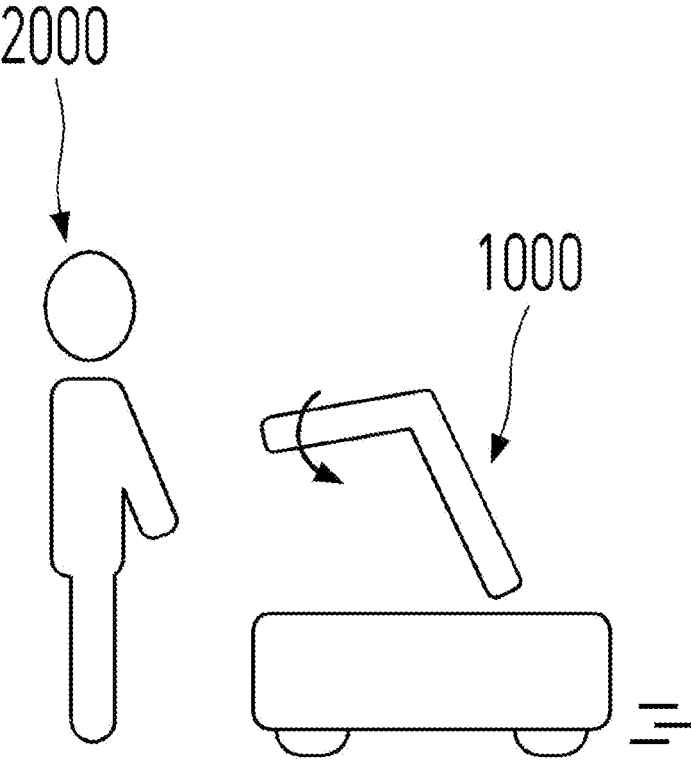
FIGS. 3A-3C are diagrams illustrating a situation of teaching a mobile manipulator robot according to an embodiment of the present disclosure.
Figure 3B:
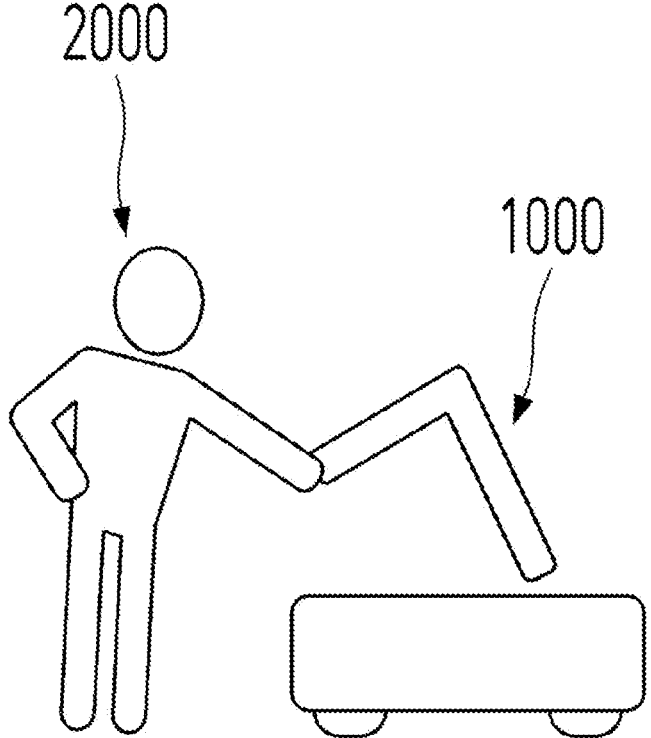
Figure 3C:
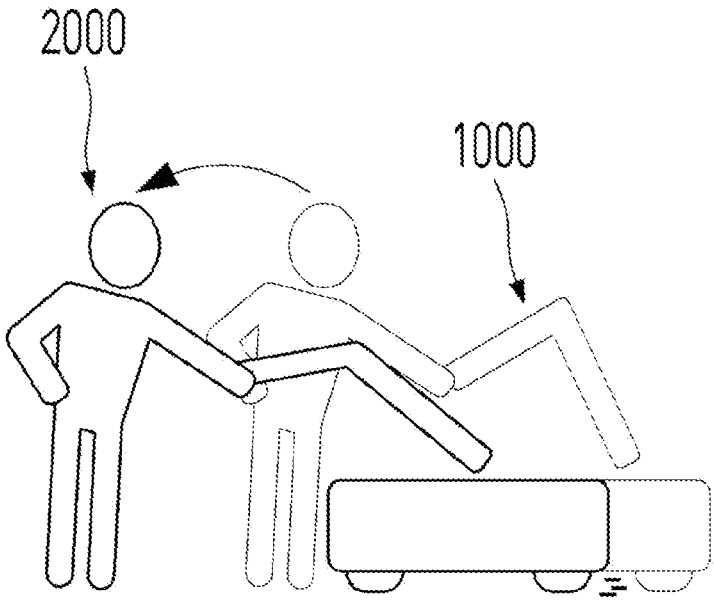

FIGS. 3A-3C are diagrams illustrating a situation of touching a mobile manipulator robot according to an embodiment of the present disclosure.

First, as shown in FIG. 3A, when it is determined using the LiDAR sensor 110, the camera sensor 120, and the like of the AMR 100 that the worker is located within a predetermined distance in an operating or standby state of the robot 1000, the mobile manipulator robot 1000 may determine that a worker 2000 has approached.

As shown in FIG. 3B, when the worker grips the manipulator robot 200 after recognition of the worker 2000 is performed, the mobile manipulator robot 1000 may recognize a contact with the worker 2000. As shown in FIG. 3C, the mobile manipulator robot 1000 may activate the touching mode after the recognition of the contact with the worker 2000 is performed, and a direction in which the worker 2000 is to move may be predicted in the touching mode to operate the mobile manipulator robot 1000 in the corresponding direction.

In this regard, the mobile manipulator robot 1000 may predict the direction of the worker 2000 using the torque, current, force, image sensors and the like mounted on the manipulator robot 200. Therefore, because the mobile manipulator robot 1000 is operated in the direction the worker 2000 intends, the worker 2000 may manipulate the mobile manipulator robot 1000 even with a small force.

Figure 4:
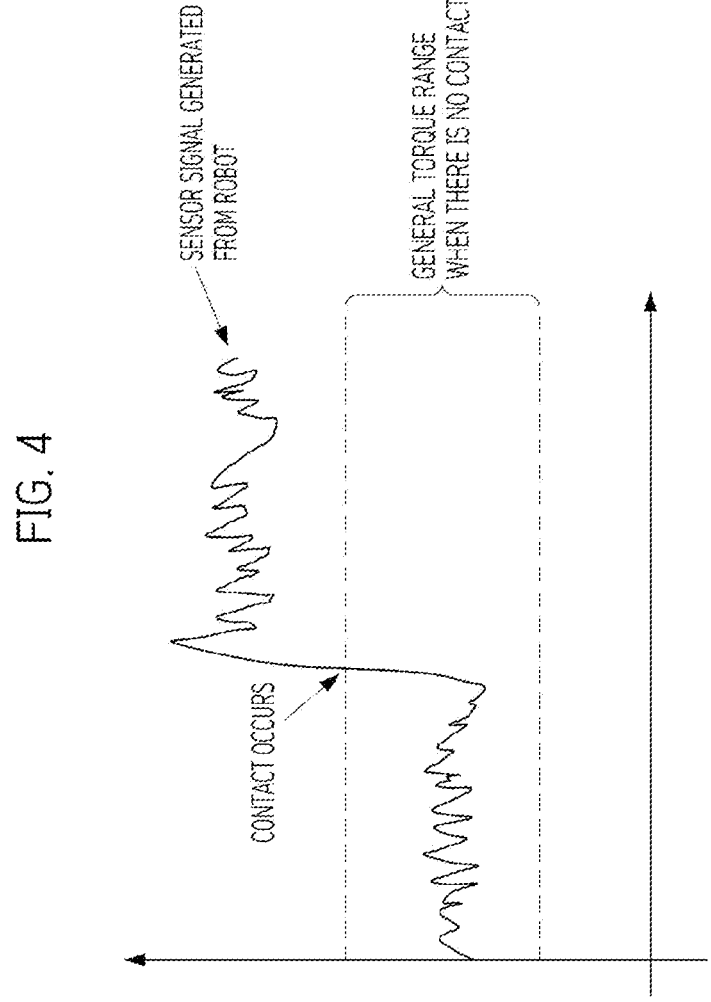
FIG. 4 is a diagram for illustrating contact information for determining whether a mode for teaching a mobile manipulator robot is activated according to an embodiment of the present disclosure.

FIG. 4 is a diagram for illustrating contact information for determining whether a mode for touching a mobile manipulator robot is activated according to an embodiment of the present disclosure.

First, referring to FIG. 4, when a contact between the manipulator robot 200 and the worker 2000 occurs resulted from interference of the worker 2000, the mobile manipulator robot 1000 may recognize the contact via the contact sensor assembly (the current, torque, and force sensors).

When there is no contact between the manipulator robot 200 and the worker 2000, the mobile manipulator robot 1000 may receive the sensor information within a general torque range recognizable by the manipulator robot 200, and may operate using a torque required for work like a general industrial robot when there is no interference of the worker 2000.

On the other hand, when the worker 2000 interferes with the mobile manipulator robot 1000, a torque out of the general torque range may be generated, and the mobile manipulator robot 1000 may receive a torque signal from the manipulator robot 200 to activate the touching mode.

FIGS. 5A-5B, 6, 7A-7D, and 8A-8C are diagrams illustrating a situation of analyzing a force applied to a mobile manipulator robot according to an embodiment of the present disclosure.

Figure 5A:
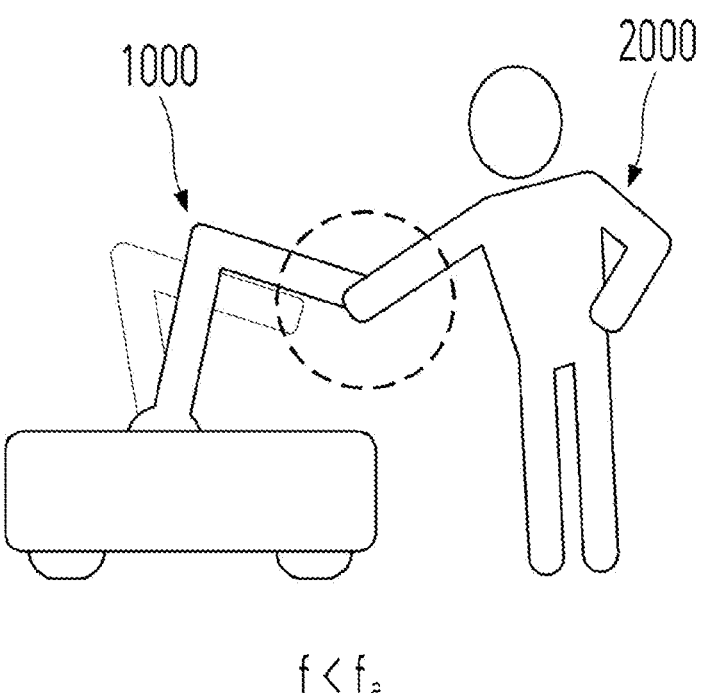
FIGS. 5A-5B, 6, 7A-7D, and 8A-8C are diagrams illustrating a situation of analyzing a force applied to a mobile manipulator robot according to an embodiment of the present disclosure.

First, as shown in FIG. 5A, when a strength of a force f required for the operation of the mobile manipulator robot 1000 is within an area (f<fa) in which only the manipulator robot 200 moves in the touching mode of the mobile manipulator robot 1000, only the manipulator robot 200 may operate.

Figure 5B:
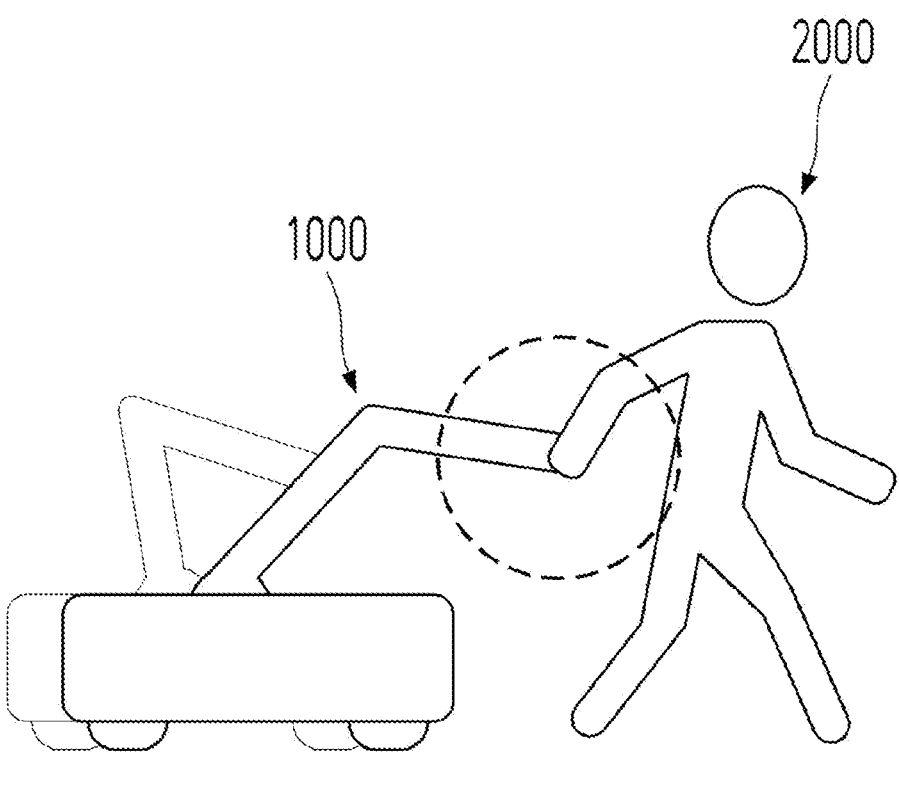

On the other hand, as shown in FIG. 5B, when the strength of the force f required for the operation of the mobile manipulator robot 1000 is within an area (fa<f<fb) in which the AMR 100 and the manipulator robot 200 move, the AMR 100 and the manipulator robot 200 may operate simultaneously.

Figure 6:
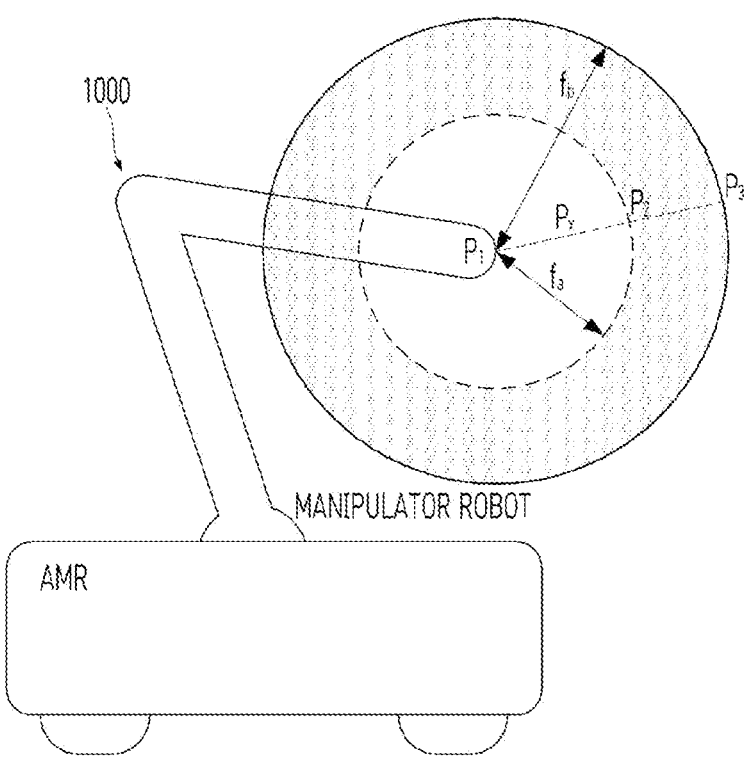

In addition, referring to FIG. 6, the mobile manipulator robot 1000 may determine the strength of the force f between the person and the robot in response to a positional movement of the distal end of the manipulator robot 200 based on touching of the person.

In this regard, the strength of the force f between the person and the robot may be calculated using Equation 1 below.

$$f = \alpha \cdot (P_x - P_1) \qquad \text{[Equation 1]}$$

Here, P1 may be a location of the distal end of the manipulator robot before the touching, and PX may be a location of the distal end of the manipulator robot after the touching.

Accordingly, when the distal end of the manipulator robot moves from the current location P1 to a first movement location P2, the mobile manipulator robot 1000 may calculate the strength of the force f between the person and the robot.

When the strength of the force f between the person and the robot is smaller than the area fa in which only the manipulator robot 2 moves, the mobile manipulator robot 1000 may control only the manipulator robot 200 to operate.

In addition, when the distal end of the manipulator robot 200 moves from the current location P1 to a second movement location P3, the mobile manipulator robot 1000 may calculate the strength of the force f between the person and the robot.

When the strength of the force f between the person and the robot exceeds the range of force fa in which only the manipulator robot 200 moves and is smaller than the area in which the AMR 100 and the manipulator robot 200 move, the mobile manipulator robot 1000 may control the AMR 100 and the manipulator robot 200 to operate simultaneously.

In addition, the mobile manipulator robot 1000 may determine that the worker operates the robot 1000 with an intention of touching only after a certain time period passes after the force is generated. The mobile manipulator robot 1000 may not operate immediately when the force f between the person and the robot is generated, but may start performing the operation based on the touching when a time period ft of maintaining the force exceeds a predetermined time period Ts.

As shown in FIGS. 7A-7D, the operation of the mobile manipulator robot 1000 may be changed based on a location of the contact between the worker 2000 and the manipulator robot 200.

That is, the mobile manipulator robot 1000 may control the operations of the AMR 100 and the manipulator robot 200 by distinguishing the contact location of the manipulator robot 200 in the touching mode.

Figure 7A:
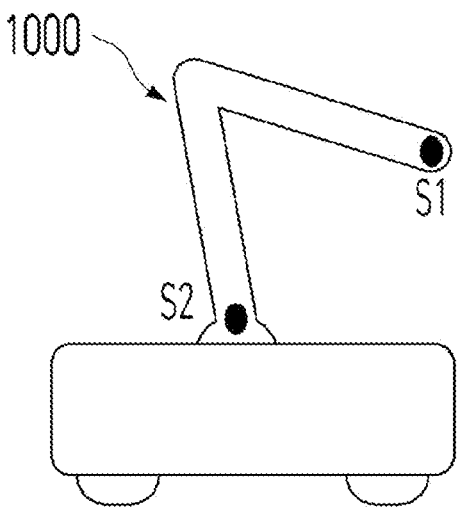

As shown in FIG. 7A, a description will focus on cases in which the locations of contact between the worker 2000 and the manipulator robot 200 are a distal end S1 and a connecting portion S2.

Figure 7B:
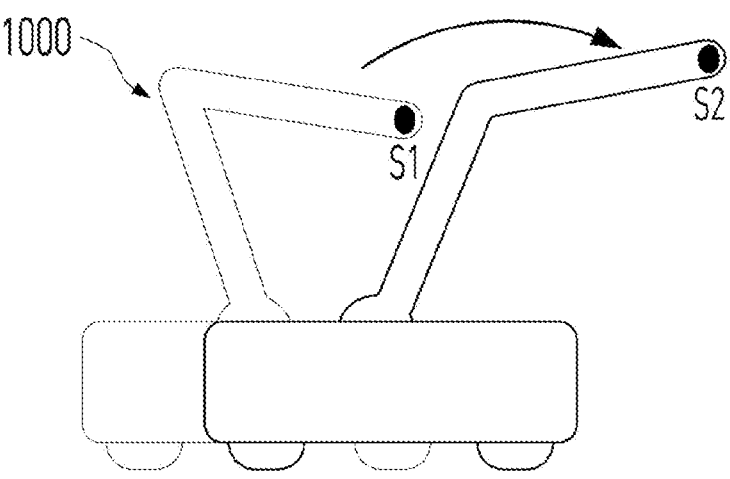

As shown in FIG. 7B, when the location of contact between the worker 2000 and the manipulator robot 200 is the distal end S1, the mobile manipulator robot 1000 may determine that all of the axes of the manipulator robot 200 are moveable.

When all of the axes are moveable, the mobile manipulator robot 1000 may control the movement of the AMR 100 and the manipulator robot 200 based on the strength and the applied time period of the force f between the worker 2000 and the robot.

Figure 7C:
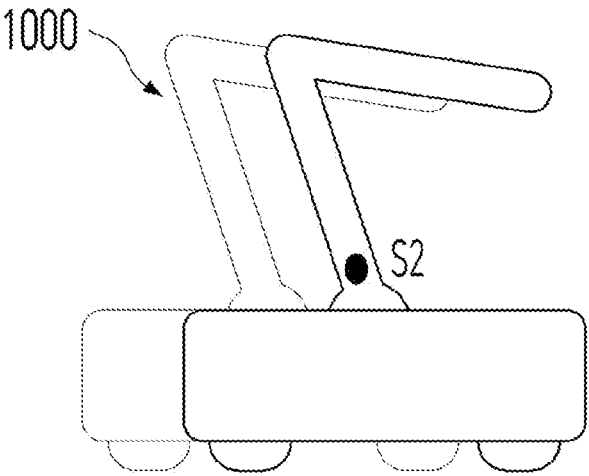
Figure 7D:
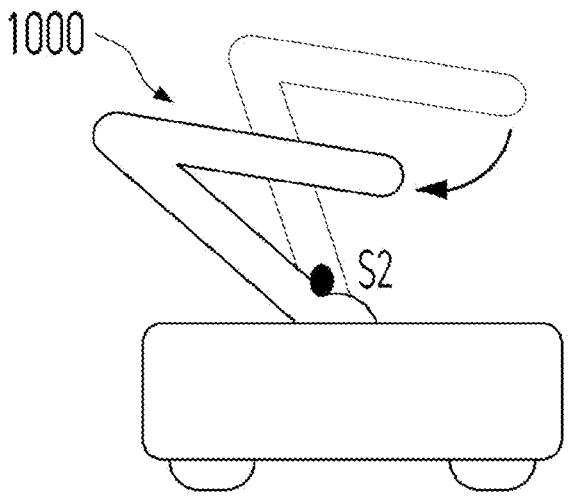

On the other hand, when the location of contact between the worker 2000 and the manipulator robot 200 is the connecting portion S2, the mobile manipulator robot 1000 may control only the AMR 100 to operate as shown in FIG. 7C or control only the manipulator robot 200 to operate as shown in FIG. 7D.

In this regard, in a mode for moving only some axes of the manipulator robot 200, the mobile manipulator robot 1000 may control the operation by dividing areas from each other using the point where the contact with the person occurs as a boundary.

Figure 8A:
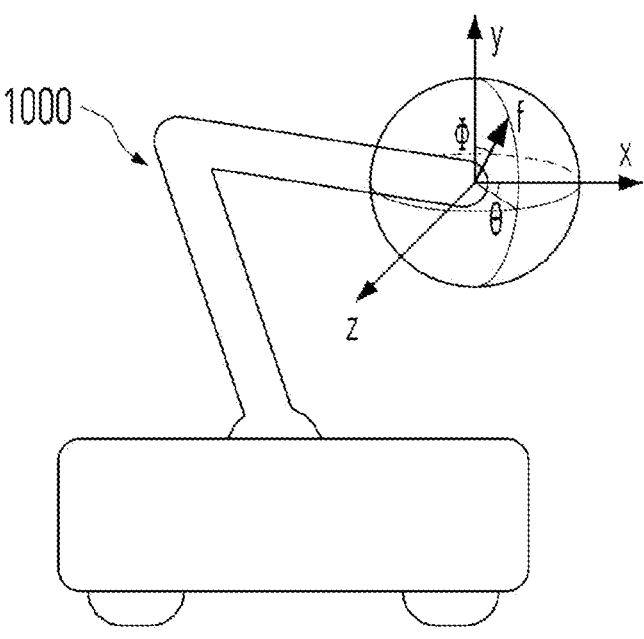

As shown in FIG. 8A, the mobile manipulator robot 1000 may control the movement by analyzing a direction of the force f between the worker 2000 and the robot in the touching mode.

In this regard, because the force is generated in a three-dimensional space, the mobile manipulator robot 1000 may analyze the direction of the force fin the XY plane and the XY plane, respectively.

Figure 8B:
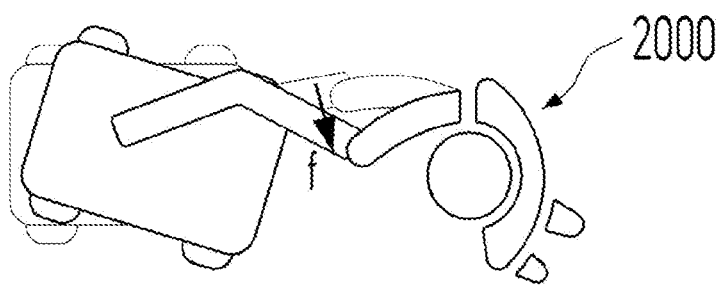

As shown in FIG. 8B, because the force is generated in the three-dimensional space, the mobile manipulator robot 1000 may analyze the direction by projecting the force f onto the XZ plane. The mobile manipulator robot 1000 may control the AMR 100 to move in response to the analyzed direction on the XZ plane.

Figure 8C:
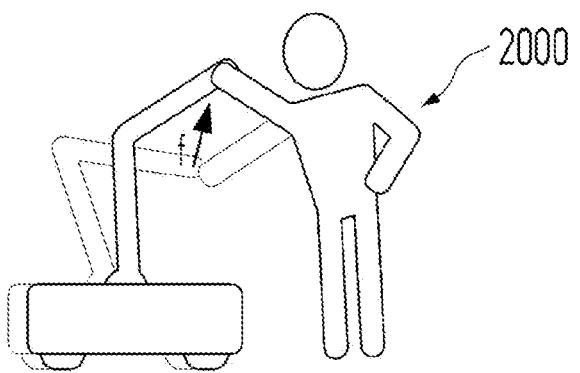

In addition, as shown in FIG. 8C, because the force is generated in the three-dimensional space, the mobile manipulator robot 1000 may analyze the direction by projecting the force f onto the two-dimensional XY plane.

The mobile manipulator robot 1000 may control the manipulator robot 200 to move in the three-dimensional space in the direction of the force based on the analyzed directions on the XZ plane and the XY plane.

Figure 9:
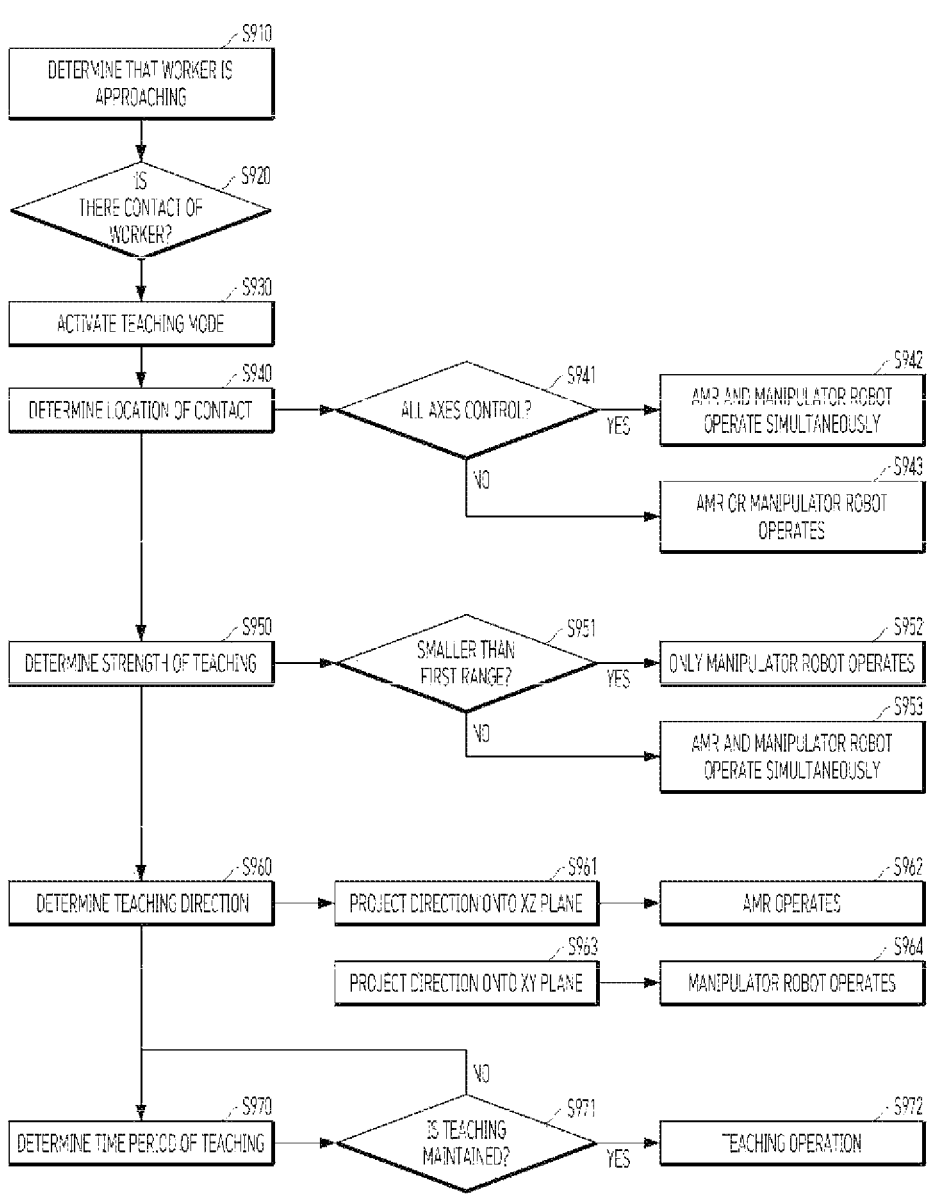
FIG. 9 is a flowchart for illustrating a method for teaching a mobile manipulator robot according to an embodiment of the present disclosure.

FIG. 9 is a flowchart for illustrating a method for touching a mobile manipulator robot according to an embodiment of the present disclosure.

First, the mobile manipulator robot 1000 according to the present embodiment may determine that the worker is approaching via the sensor information of the AMR 100 (S910) and determine the contact with the worker via the sensor information received from the manipulator robot 200 (S920) to activate the touching mode (S930). The touching mode may be a control mode for predicting the direction in which the worker is to move and moving the mobile manipulator robot in the corresponding direction.

When activating the touching mode, the mobile manipulator robot 1000 may determine the location of contact between the manipulator robot 200 and the worker 2000 (S940). The mobile manipulator robot 1000 may determine whether to control all of the axes of the manipulator robot 200 based on the contact location (S941), and when all of the axes need to be controlled, control the AMR 100 and the manipulator robot 200 to operate simultaneously (S942). When it is not the case of controlling all of the axes, the mobile manipulator robot 1000 may control the AMR 100 or the manipulator robot 200 to operate (S943).

In addition, after determining the contact location, the mobile manipulator robot 1000 may determine the strength of the force by the touching (S950).

The mobile manipulator robot 1000 may control only the manipulator robot 200 to operate when the strength of the force is smaller than the first range (S951). When the strength of the force is not smaller than the first range, the mobile manipulator robot 1000 may control the AMR 100 and the manipulator robot 200 to operate simultaneously (S953).

In addition, the mobile manipulator robot 1000 may determine a touching direction after determining the strength of the force by the touching (S960).

When the force is generated in the three-dimensional space by the touching, the mobile manipulator robot 1000 may project the direction of the generated force onto the XZ plane (S961), and control the AMR 100 to operate based on the projected direction of the force (S962). Then, the mobile manipulator robot 1000 may project the direction of the generated force onto the XY plane (S963), and control the manipulator robot 200 to operate based on the projected direction of the force (S964).

Thereafter, the mobile manipulator robot 1000 may determine the applied time period of the force generated by the touching (S970).

When the force by the touching is maintained for the predetermined time period Ts or more (S971), the mobile manipulator robot 1000 may control the touching operation to be performed (S972).

FIGS. 10A-10B and 11A-11B are diagrams for illustrating a safety situation of a mobile manipulator robot according to an embodiment of the present disclosure.

Figure 10A:
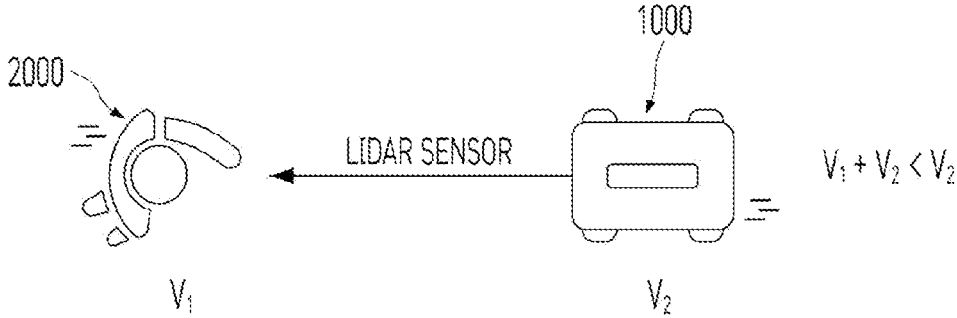
FIGS. 10A-10B and 11A-11B are diagrams illustrating a safety situation of a mobile manipulator robot according to an embodiment of the present disclosure.

First, as shown in FIG. 10A, the mobile manipulator robot 1000 may determine whether an obstacle sensed by the LiDAR sensor is a moving object using a relative speed with the obstacle. The mobile manipulator robot 1000 may use the LiDAR sensor 110 to determine whether the obstacle is moving or fixed using a speed of the AMR 100 and the relative speed of the approaching obstacle. When determining that the obstacle is moving, the mobile manipulator robot 1000 may determine whether the obstacle is the person or the thing using the image sensor 220.

This is a case in which an obstacle 2000 sensed by the mobile manipulator robot 1000 is approaching at a first speed V1 and the mobile manipulator robot 1000 is moving at a second speed V2.

The mobile manipulator robot 1000 may determine that the obstacle 2000 is approaching when a sum of the first speed V1 and the second speed V2 is smaller than the second speed V2.

Figure 10B:
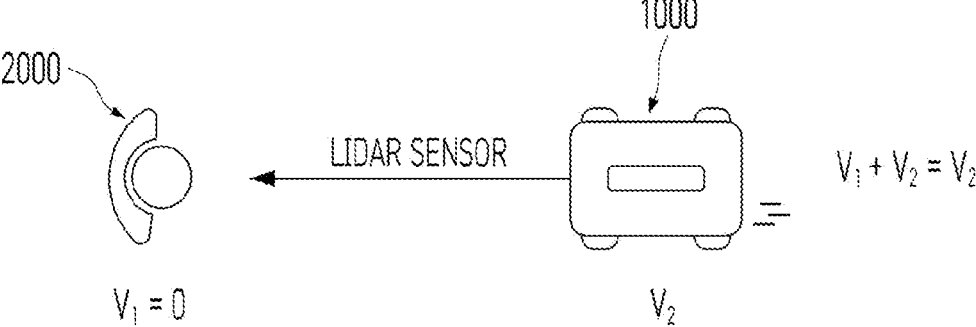

On the other hand, as shown in FIG. 10B, when the sum of the first speed V1 and the second speed V2 is equal to the second speed V2, the mobile manipulator robot 1000 may determine that the obstacle is stopped. That is, the first speed V1 of the obstacle may be determined to be zero.

When determining that the worker 2000 is approaching, the mobile manipulator robot 1000 may operate in classified modes by determining a situation captured by the image sensor 220.

Figure 11A:
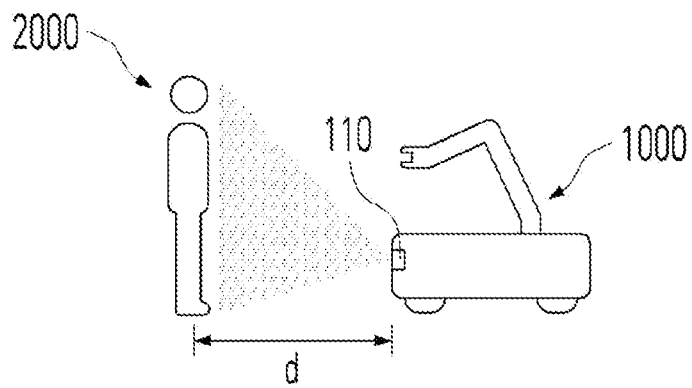

As shown in FIG. 11A, the mobile manipulator robot 1000 may distinguish the worker using the image sensor when a distance sensed by the LiDAR sensor 110 is within a certain area d.

The mobile manipulator robot 1000 may monitor the periphery of the AMR 100 to determine whether the obstacle is the thing that needs to be avoided or the worker who needs protection. The mobile manipulator robot 1000 may search for the object approaching the robot using the LiDAR sensor 110 that may recognize the obstacle up to a long distance. When the object is within the certain area of the AMR 100, the mobile manipulator robot 1000 may determine whether the corresponding object is the thing or the worker using the image sensor 120.

Figure 11B:
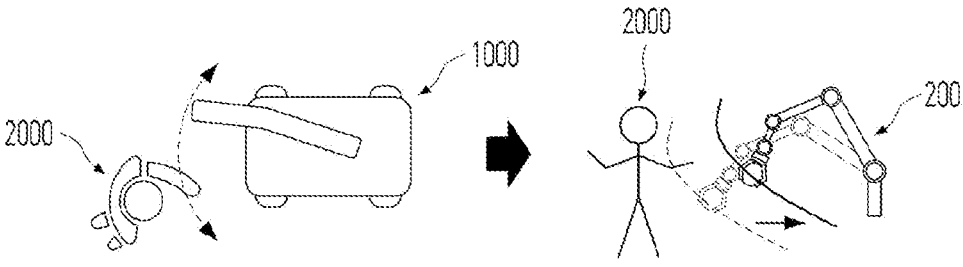

As shown in FIG. 11B, when the object is the thing, the mobile manipulator robot 1000 may avoid the thing or stop by creating a new path. When the worker 2000 enters a work area, the mobile manipulator robot 1000 may modify a path of the manipulator robot 200.

When the object is the worker, the mobile manipulator robot 1000 may change a working mode depending on how close the worker is. The mobile manipulator robot 1000 may switch to the safe mode when the contact with the worker 2000 has occurred or may occur.

Figure 12A:
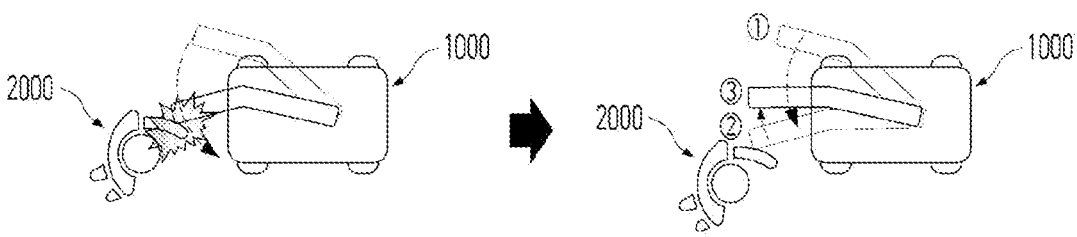
FIGS. 12A-12B are diagrams illustrating an operation of a safe mode of a mobile manipulator robot according to an embodiment of the present disclosure.
Figure 12B:
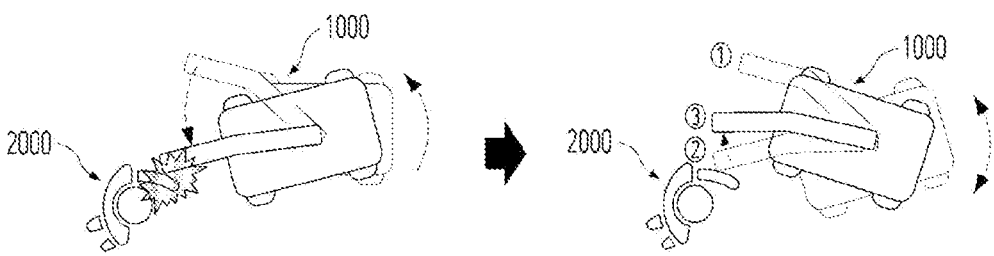

FIGS. 12A-12B are diagrams for illustrating an operation of a safe mode of a mobile manipulator robot according to an embodiment of the present disclosure.

As shown in FIG. 12A, when the AMR 100 of the mobile manipulator robot 1000 is stopped and the manipulator robot 200 moves and makes contact with the worker 2000, the manipulator robot 200 may give an impact to the worker 2000 in a moving direction and may move further in the moving direction.

Thereafter, when the manipulator robot 200 comes into contact with the worker 200 in the moving direction, the manipulator robot 200 may move in an opposite direction to the one that caused the contact to reduce the impact.

As shown in FIG. 12B, when the manipulator robot 200 comes into contact with the worker 2000 while the manipulator robot 200 and the AMR 100 of the mobile manipulator robot 1000 are operating together, the manipulator robot 100 may give the impact to the worker 2000 and stop.

Thereafter, in response to the case in which the manipulator robot 200 comes into contact with the worker 2000, the manipulator robot 200 may move in the opposite direction to the one that caused the contact, and the AMR 100 may also move in an opposite direction to the moving direction before the contact to reduce the impact.

FIGS. 13A-13D are diagrams illustrating a collision avoidance operation of a mobile manipulator robot according to an embodiment of the present disclosure.

Figure 13A:
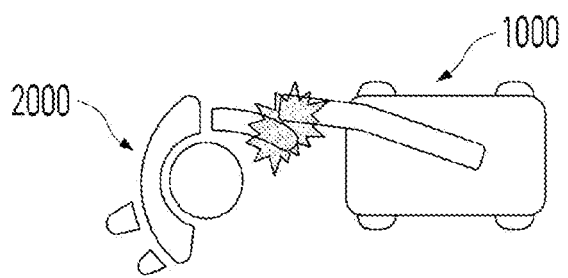
FIGS. 13A-13D are diagrams illustrating a collision avoidance operation of a mobile manipulator robot according to an embodiment of the present disclosure.

As shown in FIG. 13A, the mobile manipulator robot 1000 may sense the impact with the worker 2000 during the operation.

Figure 13B:
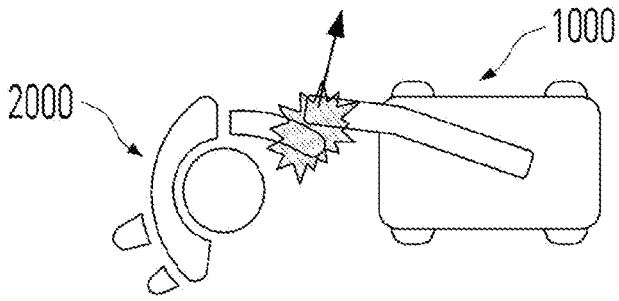

Thereafter, as shown in FIG. 13B, the mobile manipulator robot 1000 may calculate a force between the person and the manipulator robot 200 resulted from the impact. In addition, the mobile manipulator robot 1000 may generate opposite vector coordinates in response to the direction in which the person 2000 and the manipulator robot 200 have collided with each other.

Figure 13C:
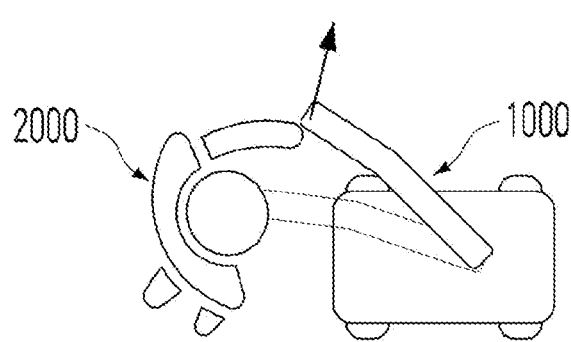

In addition, as shown in FIG. 13C, the mobile manipulator robot 1000 may control the manipulator robot 200 to perform the avoidance operation based on the generated opposite vector coordinates.

Figure 13D:
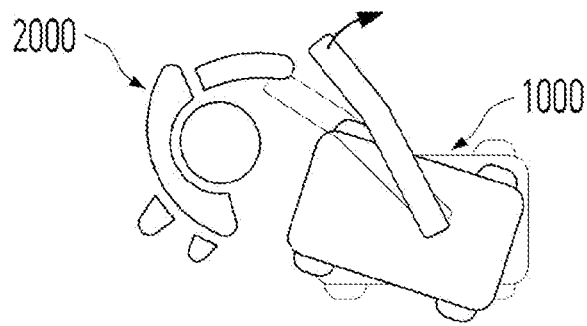

In this regard, when a hardware limit is reached in response to the avoidance operation of the manipulator robot 200 and thus the collision avoidance is no longer possible, the mobile manipulator robot 1000 may control the AMR 100 and the manipulator robot 200 to operate simultaneously as shown in FIG. 13D.

FIGS. 14A-14D and 15A-15B are diagrams for illustrating a situation of returning to work after an avoidance operation of a mobile manipulator robot according to an embodiment of the present disclosure.

Figure 14A:
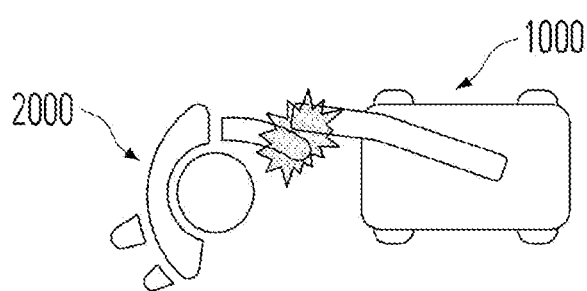
FIGS. 14A-14D and 15A-15B are diagrams illustrating a situation of returning to work after an avoidance operation of a mobile manipulator robot according to an embodiment of the present disclosure.

As shown in FIG. 14A, when sensing the impact, the mobile manipulator robot 1000 may determine that the collision has occurred when a magnitude of the impact is greater than a predetermined boundary value.

The mobile manipulator robot 1000 may store the respective locations of the AMR 100 and the manipulator robot 200 at the moment when the collision occurs. In this regard, the location information corresponding to the AMR 100 may include global x, y, and theta, and the location information corresponding to the manipulator robot 200 may include an angle of each axis.

Figure 14B:
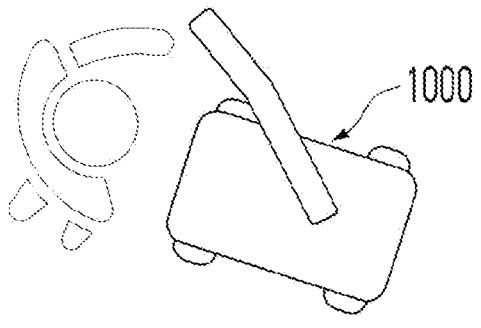

Thereafter, as shown in FIG. 14B, the mobile manipulator robot 1000 may determine whether the collision situation is released after the collision avoidance.

To this end, the mobile manipulator robot 1000 may determine whether the impact from the worker 2000 is being continuously applied. The mobile manipulator robot 1000 may determine that the collision situation continues when the force is being continuously applied.

In addition, the mobile manipulator robot 1000 may determine that the collision situation is released when the magnitude of the impact is smaller than the predetermined boundary value and a predetermined time period passes.

Figure 14C:
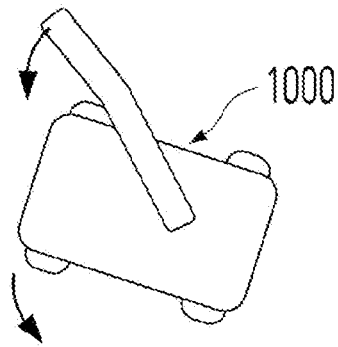

As shown in FIG. 14C, the mobile manipulator robot 1000 may move to return to the location stored upon the collision after the collision avoidance.

Figure 14D:
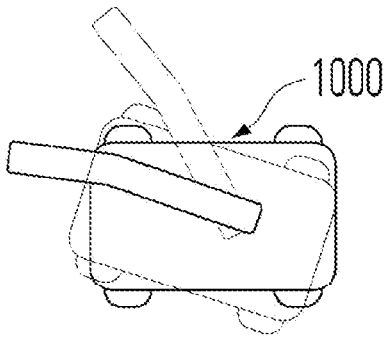

Accordingly, as shown in FIG. 14D, the mobile manipulator robot 1000 may return to the location stored upon the collision at a limited movement speed for safety.

Figure 15A:
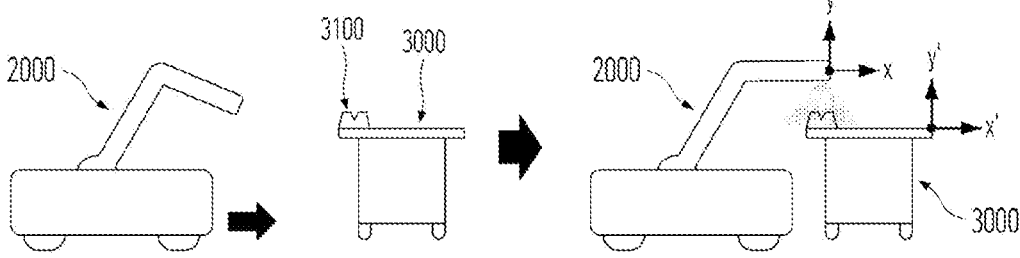
Figure 15B:
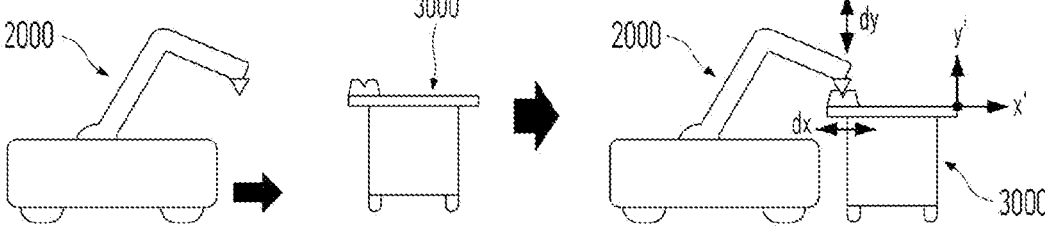

Referring to FIGS. 15A and 15B, the mobile manipulator robot 1000 may operate to minimize the movement of the AMR 100, which is a base, to accurately move to the location before the collision.

When moving due to the impact, after moving to an initial location where the collision has occurred, the mobile manipulator robot 1000 checks the location before the work. The location checking of the mobile manipulator robot 1000 may be performed by moving to a feature point 3100 of a worktable 3000 to determine accuracy of a current location. In this regard, a location of the worktable may be a fixed location.

When the returned location is displaced from the initial location, the mobile manipulator robot 1000 may continue to work by correcting the location by an amount of displacement via calibration.

To this end, as shown in FIG. 15A, the mobile manipulator robot 1000 may move to the location of the worktable, and an image of the feature location on the worktable may be captured via the image sensor located at the distal end of the manipulator robot 200. The mobile manipulator robot 1000 may perform the coordinate correction based on the captured image.

As shown in FIG. 15B, the mobile manipulator robot 1000 may move to a work location for the calibration. Thereafter, the mobile manipulator robot 1000 may move the manipulator robot 200 to a specific location and measure a degree of movement of the robot 200. The mobile manipulator robot 1000 may move little by little on x, y, and z coordinates at a time point at which the movement is completed. When there is no movement of the manipulator robot 200 and a force occurs in an opposite direction to the moving direction, it may be determined that the movement to the specific location has been completed.

Therefore, the mobile manipulator robot 1000 may correct a calibration coordinate offset. When there is no displacement, the mobile manipulator robot 1000 may determine that dx and dy of the manipulator robot 200 are 0. When there is the displacement, the mobile manipulator robot 1000 may reflect previous values and the degree of displacement in response to generation of dx and dy of the manipulator robot 200.

Figure 16A:
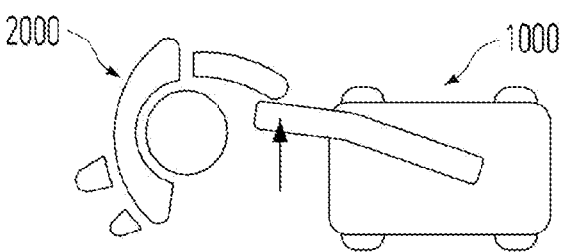
FIGS. 16A-16B are diagrams illustrating a movement situation of a mobile manipulator robot in a safe mode according to an embodiment of the present disclosure.
Figure 16B:
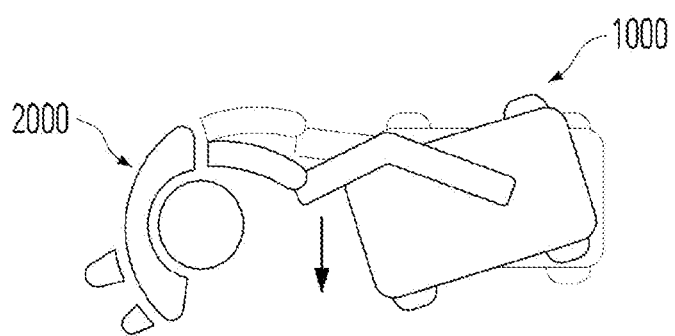

FIGS. 16A and 16B are diagrams for illustrating a movement situation of a mobile manipulator robot in a safe mode according to an embodiment of the present disclosure.

Referring to FIG. 16A, when the contact between the manipulator robot 200 and the worker 2000 occurs while the manipulator robot 200 is moving in a first direction, as shown in FIG. 16B, the robot 200 may move in a second direction in which the worker applies the force. That is, the mobile manipulator robot 1000 may control the manipulator robot 200 and the AMR 100 in an integrated manner to move in an opposite direction of the force of the contact with the worker 2000. Therefore, the mobile manipulator robot 1000 has an advantage of minimizing the impact applied to the worker 2000.

Figure 17:
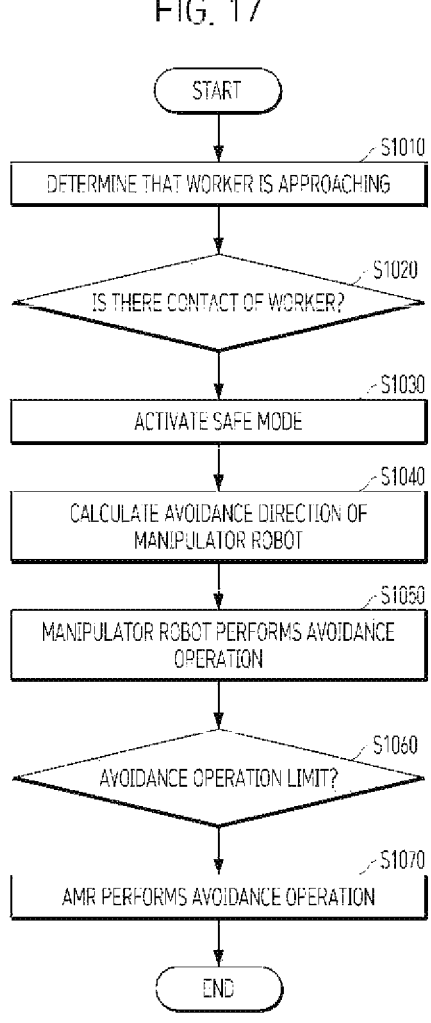
FIG. 17 is a flowchart for illustrating a safety control method of a mobile manipulator robot according to an embodiment of the present disclosure.

FIG. 17 is a flowchart for illustrating a safety control method of a mobile manipulator robot according to an embodiment of the present disclosure.

First, the mobile manipulator robot 1000 according to the present embodiment may determine that the worker 2000 is approaching via the sensor information of the AMR 100 (S1010) and determine the contact with the worker 2000 via the sensor information received from the manipulator robot 200 (S1020) to activate the safe mode (S1030). In this regard, the safe mode may be the control mode for predicting the direction in which the worker 2000 is to move and moving the mobile manipulator robot 1000 in the corresponding direction.

When activating the safe mode, the mobile manipulator robot 1000 may calculate the avoidance direction of the manipulator robot 200 (S1040).

The mobile manipulator robot 1000 may control the manipulator robot 200 to perform the avoidance operation based on the calculated avoidance direction (S1050).

The mobile manipulator robot 1000 may determine whether the collision avoidance is no longer possible because the hardware limit of the manipulator robot 200 is reached (S1060).

When the collision avoidance is impossible, the mobile manipulator robot 1000 may control the manipulator robot 200 and the AMR 100 to perform the avoidance operation (S1070).

As described above, the present disclosure provides an efficient touching method for an operation of a mobile manipulator, which is an integrated system of an autonomous mobile robot (AMR) and a manipulator robot.

As described above, the worker may intuitively touch the mobile manipulator robot, which is a new type of robot.

As described above, the touching is possible without considering the location of the autonomous mobile robot.

As described above, because the mobile manipulator operates in response to the intention of the worker, the mobile manipulator may be moved without exerting a great force.

As another aspect of the present disclosure, the operation described above may be provided as a code or an application that stores or includes the code, a computer-readable storage medium, or a computer program product that may be embodied, implemented, or executed by a "computer" (a comprehensive concept including a system on chip (SoC), a microprocessor, or the like), which also falls within the scope of rights of the present disclosure.

The computing apparatuses, the electronic devices, the processors, the units, the memories, and other components described herein are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in the figures that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EE-PROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-Res, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A mobile manipulator robot system comprising:
an autonomous mobile robot (AMR) comprising a LiDAR sensor, a camera sensor, and a moving member;
a manipulator robot comprising a torque sensor, a current sensor, and an image sensor; and
a processor is configured to:
determine, via the AMR, whether a worker is approaching;
determine, via the manipulator robot, whether the worker interferes with an operation of the mobile manipulator robot;
activate a touching mode, in response to the determining of the interference by the worker;
analyze a force for a robot operation based on touching to operate at least one of the AMR or the manipulator robot;
recognize the worker via the AMR to determine whether the worker is approaching;
determine, via the manipulator robot, whether the worker collides with the mobile manipulator robot;
activate a safe mode in response to the collision with the worker;
analyze an avoidance direction based on the collision to control at least one of the AMR of the manipulator robot;
calculate the avoidance direction of the manipulator robot, in response to determining that the worker collides with the manipulator robot;
control the manipulator robot to perform an avoidance operation, in response to the avoidance direction being calculated;
determine whether the mobile manipulator robot will collide with the worker, based on the avoidance operation of the manipulator robot; and
control the AMR and the manipulator robot to simultaneously perform the avoidance operation, in response to the mobile manipulator robot colliding with the worker.

2. The mobile manipulator robot system of claim 1, wherein the processor is further configured to:
recognize a contact of the worker via sensor information received from the manipulator robot, in response to the worker gripping the manipulator robot; and
determine that the interference with the worker has occurred, in response to the sensor information received from the manipulator robot exceeding a threshold.

3. The mobile manipulator robot system of claim 1, wherein the processor is further configured to:
determine a location of contact between the manipulator robot and the worker;
determine a strength of the force needed for the robot operation;
determine a direction of the force needed for the robot operation; and
determine an applied time period of the force needed for the robot operation.

4. The mobile manipulator robot system of claim 3, wherein the processor is further configured to:
determine whether to control all axes or to control some axes of the manipulator robot based on the location of the contact; and
control the AMR and the manipulator robot to operate simultaneously, in response to determining to control all of the axes.

5. The mobile manipulator robot of claim 4, wherein the processor is further configured to control the AMR or the manipulator robot to operate, in response to determining to control some of the axes.

6. The mobile manipulator robot system of claim 3, wherein the processor is further configured to control only the manipulator robot to operate, in response to determining the strength of the force for the robot operation is smaller than a first range.

7. The mobile manipulator robot system of claim 3, wherein the processor is further configured to control the manipulator robot and the AMR to operate simultaneously, in response to determining the strength of the force for the robot operation is equal to or greater than a first range and is equal to or lesser than a second range.

8. The mobile manipulator robot system of claim 3, wherein the processor is further configured to:
control the AMR to operate by projecting the direction of the force for the robot operation to a XZ plane; and
control the manipulator robot to operate by projecting the direction of the force for the robot operation to a XY plane.

9. The mobile manipulator robot system of claim 3, wherein the processor is further configured to control the mobile manipulator robot to operate by the touching, in response to the force for the robot operation being generated and maintained for a time period or more.

10. The mobile manipulator robot system of claim 1, wherein the processor is further configured to:
determine whether a distance sensed by the LiDAR sensor is within a threshold area; and
distinguish the worker using the image sensor when the distance is within the threshold area.

11. The mobile manipulator robot system of claim 1, wherein the processor is further configured to generate vector coordinates in an opposite direction of an impact caused by the collision between the mobile manipulator robot and the worker.

12. The mobile manipulator robot system of claim 11, wherein the processor is further configured to determine whether the vector coordinates are beyond a movement limit of the manipulator robot.

13. The mobile manipulator robot system of claim 1, wherein the processor is further configured to control the mobile manipulator robot to return to a state before the collision after the avoidance operation.

14. The mobile manipulator robot system of claim 13, wherein the processor is further configured to:
store location information of each of the manipulator robot and the AMR at a moment when the collision occurs;
determine whether the collision situation is released by the avoidance operation;
control at least one of the manipulator robot or the AMR to move to the stored location, in response to the collision situation is released by the avoidance operation.

15. The mobile manipulator robot system of claim 14, wherein the processor is further configured to:

determine whether a magnitude of an impact caused by the collision is equal to or smaller than a threshold;

determine whether the impact is applied within a predetermined time period, in response to the magnitude of the impact being equal to or smaller than the threshold; and determine that the collision situation is released, in response to the impact being applied within the predetermined time period.

16. The mobile manipulator robot system of claim 13, wherein the processor is further configured to:

check a location before when the AMR moves before the collision;

check the location via the manipulator robot corresponding to a feature point of a worktable; and correct the location of the mobile manipulator robot via calibration.

17. A processor-implemented method for controlling a mobile manipulator robot including an autonomous mobile robot (AMR) and a manipulator robot, the method comprising:

determining, via the AMR, whether a worker is approaching;

determining, via the manipulator robot, whether the worker interferes with an operation of the mobile manipulator robot;

activating a touching mode, in response to the determining of the interference by the worker; and analyzing a force for a robot operation based on touching to operate at least one of the AMR or the manipulator robot;

recognizing the worker via the AMR to determine whether the worker is approaching;

determining, via the manipulator robot, whether the worker collides with the mobile manipulator robot;

activating a safe mode in response to the collision with the worker;

analyzing an avoidance direction based on the collision to control at least one of the AMR or the manipulator robot;

calculating the avoidance direction of the manipulator robot, in response to determining that the worker collides with the manipulator robot;

controlling the manipulator robot to perform an avoidance operation, in response to the avoidance direction being calculated;

determining whether the mobile manipulator robot will collide with the worker, based on the avoidance operation of the manipulator robot;

controlling the AMA and the manipulator robot to simultaneously perform the avoidance operation, in response to the mobile manipulator robot colliding with the worker.

18. A processor-implemented method for safely controlling a mobile manipulator robot including an autonomous mobile robot (AMR) and a manipulator robot, the method comprising:

determining, via the AMR, whether a worker is approaching;

determining, via the manipulator robot, whether the worker collides with the mobile manipulator robot;

activating a safe mode in response to the collision with the worker; and analyzing an avoidance direction based on the collision to control at least one of the AMR or the manipulator robot;

recognizing the worker via the AMR to determine whether the worker is approaching;

determining, via the manipulator robot, whether the worker collides with the mobile manipulator robot;

activating a safe mode in response to the collision with the worker;

analyzing an avoidance direction based on the collision to control at least one of the AMR or the manipulator robot;

calculating the avoidance direction of the manipulator robot, in response to determining that the worker collides the manipulator robot;

controlling the manipulator robot to perform an avoidance operation, in response to the avoidance direction being calculated;

determining whether the mobile manipulator robot will collide with the worker, based on the avoidance operation of the manipulator robot; and controlling the AMA and the manipulator robot to simultaneously perform the avoidance operation, in response to the mobile manipulator robot colliding with the worker.

* * * * *